United States Patent
Enzien et al.

(10) Patent No.: US 7,523,626 B2
(45) Date of Patent: Apr. 28, 2009

(54) CONVEYOR BELT

(75) Inventors: Francis Enzien, Bow, NH (US); John F. Porter, St. Catharines (CA); Michael A. Kennedy, Albion, NY (US); David L. Spanton, Albion, NY (US); Philip J. Fusco, Francestown, NH (US); Lee D. Markel, Jr., Albion, NY (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 829 days.

(21) Appl. No.: 10/956,729

(22) Filed: Oct. 1, 2004

(65) Prior Publication Data

US 2006/0073752 A1   Apr. 6, 2006

(51) Int. Cl.
  *D04B 21/14* (2006.01)
(52) U.S. Cl. ...................................... 66/195
(58) Field of Classification Search ........... 139/383 AA, 139/383 R, 383 A; 66/190, 192, 193, 195, 66/196
  See application file for complete search history.

(56) References Cited

U.S. PATENT DOCUMENTS

| | | | |
|---|---|---|---|
| 3,368,663 A | | 2/1968 | Kufferath |
| 4,109,543 A | | 8/1978 | Foti |
| 4,183,993 A | * | 1/1980 | Benstead et al. ............ 442/314 |
| 4,395,308 A | * | 7/1983 | Dawes ........................ 162/232 |
| 4,425,398 A | * | 1/1984 | Berczi ........................ 442/314 |
| 4,433,493 A | * | 2/1984 | Poisson ........................ 34/116 |
| 4,472,086 A | * | 9/1984 | Leach ..................... 405/302.7 |
| 4,526,637 A | | 7/1985 | Long |
| 4,615,934 A | | 10/1986 | Ellison |
| 4,626,465 A | * | 12/1986 | Henningsson ............... 442/186 |
| 4,629,651 A | | 12/1986 | Davis |
| 4,632,863 A | * | 12/1986 | Henningsson ............... 442/186 |
| 4,650,068 A | | 3/1987 | Vanassche et al. |
| 4,699,542 A | | 10/1987 | Shoesmith |
| 4,828,909 A | | 5/1989 | Davis et al. |
| 4,957,390 A | | 9/1990 | Shoesmith |
| 5,065,599 A | * | 11/1991 | Groshens .................... 66/84 A |
| 5,110,627 A | | 5/1992 | Shoesmith et al. |
| 5,164,250 A | * | 11/1992 | Paz Rodriguez ............ 442/186 |
| 5,317,886 A | * | 6/1994 | Prahl ........................... 66/192 |
| 5,393,559 A | | 2/1995 | Shoesmith et al. |
| 5,465,764 A | * | 11/1995 | Eschmann et al. ...... 139/383 A |
| 5,713,398 A | * | 2/1998 | Josef ....................... 139/383 A |
| 5,769,131 A | * | 6/1998 | Whitlock et al. ...... 139/383 AA |
| 5,945,359 A | | 8/1999 | Graham |
| 6,174,825 B1 | * | 1/2001 | Dutt ............................ 442/43 |

(Continued)

FOREIGN PATENT DOCUMENTS

EP   0 085 641 B1   8/1983

(Continued)

*Primary Examiner*—Danny Worrell
(74) *Attorney, Agent, or Firm*—Larson Newman Abel Polansky & White, LLP; Chi Suk Kim

(57) ABSTRACT

In one particular embodiment, the disclosure is directed to a conveyor belt including a set of warp knitted yarns configured in warp-oriented wales and a set of weft insert yarns inserted in the set of warp-oriented wales. The set of weft insert yarns have a cross-sectional aspect ratio at least about 2:1.

44 Claims, 2 Drawing Sheets

U.S. PATENT DOCUMENTS

| | | | | |
|---|---|---|---|---|
| 6,250,117 B1 * | 6/2001 | Wunner | ........................ | 66/195 |
| 6,431,221 B1 * | 8/2002 | Wrigley | ................ | 139/383 AA |
| 6,572,505 B1 * | 6/2003 | Knutson | ..................... | 474/260 |
| 6,615,618 B2 * | 9/2003 | Kost | ........................... | 66/193 |
| 6,632,151 B1 * | 10/2003 | Knutson | ..................... | 474/266 |
| 6,706,376 B1 * | 3/2004 | Von Fransecky | ............ | 428/212 |
| 6,918,412 B2 * | 7/2005 | Pintz et al. | .............. | 139/383 A |
| 7,069,750 B1 * | 7/2006 | Chang | ........................ | 66/193 |
| 7,341,076 B2 * | 3/2008 | Braekevelt et al. | ............ | 139/50 |
| 2003/0061839 A1 * | 4/2003 | Kost | ........................... | 66/192 |
| 2004/0154473 A1 | 8/2004 | Keese et al. | | |

FOREIGN PATENT DOCUMENTS

| | | |
|---|---|---|
| EP | 0 279 794 B1 | 8/1988 |
| EP | 1 067 065 A2 | 1/2001 |
| GB | 2 183 263 A | 6/1987 |
| JP | 62079112 A2 | 4/1987 |
| WO | WO 88/07488 | 10/1988 |

* cited by examiner

400

| PLACE BELT OVER ROLLERS SUCH THAT LONGITUDINAL INSERTS ARE CLOSER TO THE INSIDE SURFACE OF BELT AND CONTACT ROLLERS |
| :---: |
| 402 |

↓

| ADJUST TENSION ON BELT |
| :---: |
| 404 |

CONVEYOR BELT

FIELD OF THE DISCLOSURE

This disclosure, in general, relates to conveyer belts, methods for conveyor belt construction, and methods for use of conveyor belts.

BACKGROUND

Manufacturers use conveyer systems in high temperature applications, such as textile drying, thermal curing of polymer coatings, cooking of food products, and shrink-wrap applications. For example, conveyor belts are used to convey products that are to be exposed to a heat source, such as by forced hot air in a conveyorized oven where the products conveyed are cooked, dried or cured. In other examples, products are heated by radiant heat where heat is driven through a belt by using heated platens over which the belt travels or heated by microwave energy where a microwave field cooks, dries or cures the products. Conveyer systems allow the movement of articles through ovens in a continuous fashion as opposed to batch processing, improving productivity. However, typical conveyer systems include belts that are difficult to install, difficult to maintain, and/or belts that degrade quickly when exposed to elevated temperatures.

With respect to maintenance, oftentimes, typical conveyer systems exhibit poor tracking. For example, in food applications, metallic or synthetic conveyer belts are subject to the effects of misalignment (off tracking) or thermal shock (which changes belt dimensions dramatically) during actual use, leading to belt degradation and wear on the parts of the system. To reduce the effects of machine misalignment, installation of conveyer belts and calibration of conveyer systems take considerable amounts of time and have an associated high labor expense. Even in the best of circumstances, where alignment is precise, the dimensions of the belt and/or the equipment changes with heat extremes, expanding and contracting with these hot and cold excursions, leading to degradation and wear. In addition, conveyor system downtime is expensive in the context of a manufacturing facility. Furthermore, frequent replacement of conveyer belts adds considerably to fixed expenses because conveyor belts are expensive, increasing costs associated with the manufacturing of articles. As such, improved conveyer belts and systems incorporating same would be desirable.

SUMMARY

In one particular embodiment, the disclosure is directed to a conveyer belt including a set of warp knitted yarns configured in warp-oriented wales and a set of weft insert yarns inserted in the set of warp-oriented wales. The set of weft insert yarns have a cross-sectional aspect ratio at least about 2:1.

In another exemplary embodiment, the disclosure is directed to a system including first and second rollers and a closed loop conveyor belt contacting the first and second rollers. The closed loop conveyor belt includes a set of warp knitted yarns configured in warp oriented wales and a set of weft insert yarns inserted in the set of warp oriented wales. The set of weft insert yarns have a cross-sectional aspect ratio at least about 2:1.

In a further exemplary embodiment, the disclosure is directed to a closed loop conveyor belt having opposite inner and outer major surfaces and having a set of warp insert yarns underlying a set of weft insert yarns. The warp insert yarns extend along the inner major surface.

In another exemplary embodiment, the disclosure is directed to a conveyor belt including a weft insert warp knit fabric and a polymer coating comprising fluoropolymer. In a further exemplary embodiment, the disclosure is directed to a conveyor belt including a weft insert warp knit fabric and a polymer coating comprising silicone.

In another exemplary embodiment, the disclosure is directed to a method of installing a conveyor belt. The method includes placing a conveyor belt over a set of rollers. The conveyor belt comprises a set of warp insert yarns coupled to a set of weft insert yarns by a set of warp knitted strands. The set of longitudinal strands are configured to contact the roller.

DETAILED DESCRIPTION OF THE DRAWINGS

In one particular embodiment, the disclosure is directed to a conveyer belt including weft insert yarns and having a warp knit. The weft insert yarn has a cross-sectional aspect ratio greater than about 2:1. In one exemplary embodiment, the warp knit is formed using a chain stitch. The conveyer belt may also include warp insert yarns that overlie the weft insert yarns and are coupled to the weft insert yarns using the warp knit yarns. In a further exemplary embodiment, the conveyor belt may be coated or impregnated with a polymer, such as fluoropolymer or silicone.

The yarns may be formed of monofilament yarns, but typically the yarns are formed of multifilament strands. Whether monofilament or multifilament, the yarns may be formed of continuous filaments. In an alternative example, the yarns are formed of staple. In some examples, the yarns include twisted yarns or rovings. In other examples, the yarns include untwisted filaments.

Figure 1:
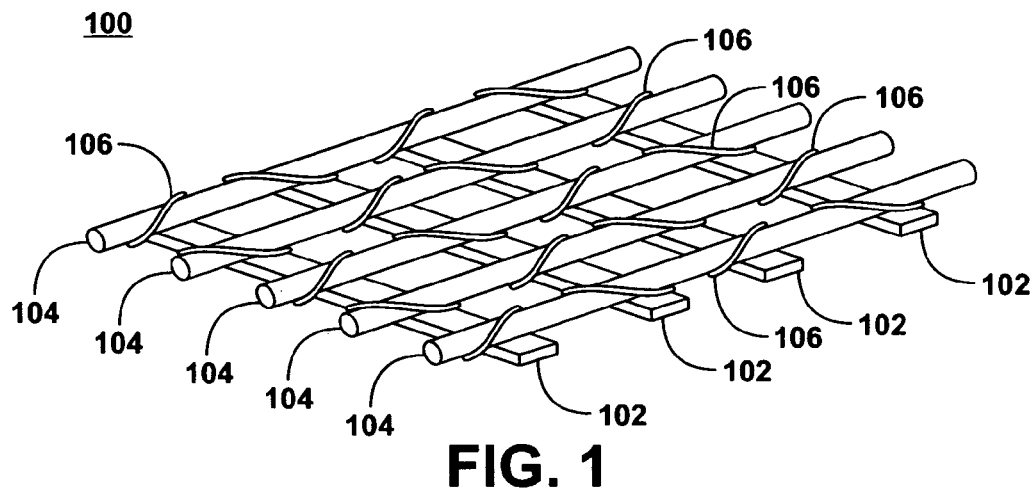
FIGS. 1 and 2 are general diagrams illustrating exemplary embodiments of a conveyer belt fabric.
Figure 2:
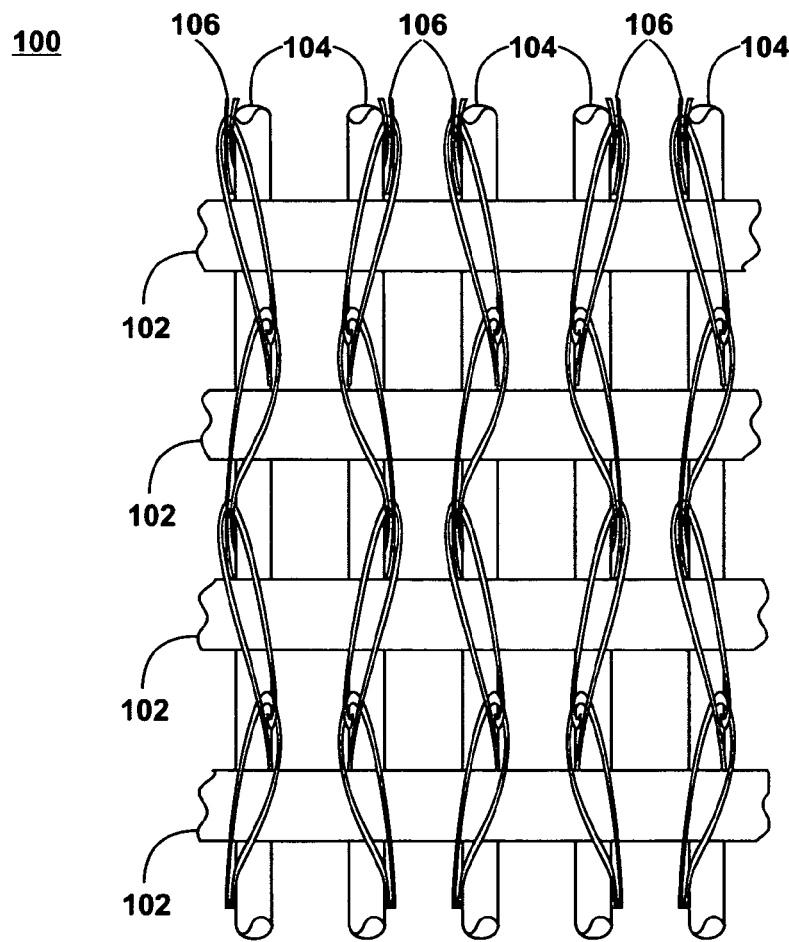

FIGS. 1 and 2 illustrate an exemplary embodiment of a fabric for use in conveyer belt. FIG. 1 illustrates a first side of the fabric 100 and FIG. 2 illustrates a second side of the fabric 100. In one particular embodiment, the fabric 100 includes two faces, the face illustrated in FIG. 1 and the face illustrated in FIG. 2. The face illustrated in FIG. 1 may exhibit a rougher contour than the face illustrated in FIG. 2.

The fabric 100 includes a set of weft insert yarns or filler 102 joined in a fabric by a set of warp knitted yarns 106. In addition, the fabric 100 may include a set of warp insert yarns 104. The warp insert yarns 104 overlie the weft insert yarns 102, when viewed from the perspective of FIG. 1 (underlie the weft insert yarns 102 when viewed from the perspective of FIG. 2), and are coupled to the weft insert yarns 102 by the knitted yarns 106. In one exemplary embodiment, the fabric 100 is configured as a closed loop conveyor belt. In a particular embodiment, the side illustrated in FIG. 1 is an inside surface of the closed loop conveyor belt and the side illustrated in FIG. 2 is an outside surface of the closed loop conveyor belt.

In one exemplary embodiment, the warp insert yarns 104 overlie the weft insert yarns 102, as illustrated from the vantage point of FIG. 1, such that the weft insert yarns cross each of the warp insert yarns 104. In one particular embodiment, the weft insert yarns 102 are perpendicular to the warp insert yarns 104. Alternatively, the weft insert yarns 102 may be biased at an angle with respect to the warp insert yarns 104.

The yarns included in the weft insert yarns 102 and the warp insert yarns 104 may be high temperature yarns capable of operating at elevated temperatures for extended periods of time without exhibiting considerable degradation or loss in performance characteristics, such as tensile strength. For example, the weft insert yarns 102 and the warp insert yarns 104 may be formed of materials capable of operating at temperatures at least about 260° C. (500° F.), such as at least about 287° C. (550° F.), at least about 300° C. (572° F.), at least about 315° C. (600° F.), at least about 343° C. (650° F.), or at least about 371° C. (700° F.). At such elevated temperatures, the yarns substantially maintain their physical properties, such as tensile strength, flex resistance, tear resistance, and knot strength, and their dimensional properties, such as length and width. For example, the yarns substantially maintain tensile strength, flex resistance, tear resistance, and knot strength. For example, materials capable of operating at temperatures of least about an operating temperature retain at least about 80% of the value of the physical property, such as tensile strength and knot strength. For example, the materials may retain at least about 85% or at least about 90% of the value of a particular physical property at a particular operating temperature. In general, the material does not substantially burn or char at an operating temperature.

In one exemplary embodiment, the weft insert yarns 102 and, optionally, the warp insert yarns 104 may be formed of single filament, or in another embodiment, a set of microfilaments. In either case, the yarns 102 and 104 may be formed of materials, such as nylon, polyester, polyphenolic compounds, polyphenelynesulphide, polybenzimidoazole, ceramic, carbon, glass, and aramids. In one particular embodiment, the yarns are formed of aramids. For example, the yarns may be formed of Nomex® (Dupont). In other exemplary embodiments, the yarns 102 and 104 are formed from Twaron® (Akzo Nobel) or Kevlar® (Dupont).

In one exemplary embodiment, the weft insert yarns 102 have a cross-sectional aspect ratio at least about 2:1, such as about 2:1 to about 35:1. The cross-sectional aspect ratio is the ratio of the width to the thickness as seen from a cross-section of the yarn that is perpendicular to the longitudinal dimension of the yarn. For example the cross-sectional aspect ratio of the weft insert yarn 102 may be at least about 3:1, at least about 5:1, or at least about 10:1. In one particular embodiment, the weft insert yarns 102 have a width at least about 1 mm and a thickness at least about 0.25 mm. In a specific embodiment, the weft insert yarn 102 has a width of about 2 mm to about 3 mm and a thickness between about 0.25 mm and about 1 mm.

The warp insert yarn 104 has an aspect ratio less than about 2:1. For example, the warp insert yarns 104 may have a cross-sectional aspect ratio not greater than about 1.9:1, not greater than about 1.7:1, not greater than about 1.3:1, or not greater than about 1.1:1. In one particular embodiment, the warp insert yarns 104 have a cross-sectional aspect ratio of approximately 1:1, defining a generally circular cross-section. In one specific embodiment, the warp insert yarns 104 are substantially circular and have a diameter of about 0.5 mm to 1 mm.

For example, the fabric 100 may include a weft insert yarn 102 having a cross-sectional aspect ratio of at least about 3:1 and a warp insert yarn 104 having a cross-sectional aspect ratio not greater than about 1.7:1. In another exemplary embodiment, the fabric 100 includes a weft insert yarn 102 having a cross-sectional aspect ratio of at least about 5:1 and a warp insert yarn 104 having a cross-sectional aspect ratio not greater than about 1.3:1. In a particular embodiment, the fabric 100 includes a weft insert yarn 102 having a cross-sectional aspect ratio of at least about 5:1 and a warp insert yarn 104 having a cross-sectional aspect ratio of about 1:1, such as approximately circular.

In one exemplary embodiment, the cross-sectional aspect ratio of the weft insert yarns 102 is at least about 1.5 times the cross-sectional aspect ratio of the warp insert yarns 104. For example, the cross-sectional aspect ratio of the weft insert yarns 102 may be at least about 2 times, at least about 5 times, or at least about 7 times the cross-sectional aspect ratio of the warp insert yarns 104.

In one exemplary embodiment, the fabric 100 includes 1 to 25 weft inset yarns 102 per fabric inch, such as 2 to 12 yarns per fabric inch or 4 to 6 yarns per fabric inch. Similarly, the fabric 100 may include 1 to 25 warp insert yarns 104 per fabric inch, such as 2 to 12 yarns per fabric inch or 4 to 6 yarns per fabric inch. In one particular embodiment, the arrangement of the yarns forms a grid or array of openings. The openings may be spaces apart by an equal distance or pitch. Generally, the openings form an open area. Depending on the knit arrangement, the number of yarns per fabric inch, and the configuration of the yarns, the open area between yarns may comprise greater than about 5% of the total fabric area such as greater than about 30%, or greater than about 50%. In one particular embodiment, the fabric 100 includes approximately 5% to 60% open area. For example, for a given section of fabric, the open area in communication between major surfaces may be about 30% of the total area of the section of fabric. When coated, the fabric may maintain the open area. Alternatively, coatings and laminates may be used, which block the open area.

The knitted yarn 106 may also be capable of operating at elevated temperatures, such as temperatures at least about 260° C. (500° F.), such as at least about 287° C. (550° F.), at least about 300° C. (572° F.), at least about 315° C. (600° F.), at least about 343° C. (650° F.), or at least about 371° C. (700° F.). Near the range of the elevated temperatures, the yarns maintain their physical properties, such as tensile strength, flex resistance, tear resistance, and knot strength. Exemplary yarns include yarns formed of a single filament or, in another embodiment, a set of microfilaments. In one exemplary embodiment, the yarn 106 may be formed of materials, such as nylon, polyester, polyphenolic compounds, polyphenelynesulphide, polybenzimidoazole, ceramic, carbon, glass, and aramids. In one particular embodiment, the yarn 106 may be formed of aramid, such as Nomex®, Twaron®, and Kevlar®.

The knitted yarns 106 may be knitted using knit patterns, such as chain knit, Tricot knit, Raschel knit, and Milanese knit. In one exemplary embodiment, the knit pattern includes a chain knit with a wale that follows the warp insert yarns 104 and effectively couples or joins the warp insert yarns 104 and the weft insert yarns 102. In another exemplary embodiment, the knitting pattern includes Tricot knit. The knitting may be shifted, un-shifted, or form interconnections between wales.

The fabric 100 may be coated or impregnated with a polymer. For example, the polymer may be coated over the outer surfaces of the yarns, leaving open area. Alternatively, polymer films may be applied or the fabric dip coated to form a conveyor belt without open area. In one exemplary embodiment, the polymer may form about 2% to about 50% by weight of the conveyor belt material, such as about 2% to about 30% by weight or about 5% to about 15% by weight of the conveyor material. In one exemplary embodiment, the polymer is capable of operating at elevated temperatures for an extended period, such as temperatures at least about 260°

C. (500° F.), such as at least about 300° C. (572° F.), at least about 315° C. (600° F.), at least about 343° C. (650° F.), or at least about 371° C. (700° F.). For example, the polymer remains substantially without burning, charring, or loss of elasticity at a specific operating temperature.

Exemplary embodiments of the polymer include fluorinated polymers. Exemplary fluorinated polymers include polymers formed of fluorinated ethylene propylene (FEP), tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride (VF$_2$), homo and copolymers having vinyl fluoride (VF), perfluoralkoxy (PFA), and combinations thereof. In one exemplary embodiment, a PTFE polymer may include polymeric modifiers, including fluoropolymers, both thermoplastic and elastomeric, such as copolymers having tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride (VF$_2$), homo and copolymers having vinyl fluoride (VF), and blends thereof. Exemplary polymer blends are described in U.S. Pat. No. 5,141,800, which is included herein in its entirety. In one particular embodiment, the fluorinated polymer includes polytetrafluoroethylyne (PTFE).

Another exemplary embodiment of the polymer includes silicone polymers. For example, the polymer may be formed from a liquid silicone rubber (LSR). An exemplary LSR formulation may comprise vinyl terminated polydimethylsiloxane polymer. The LSR formulation may further include catalysts, fillers, crosslinking agents, inhibitors, pigments, and other additives. The silicone may include a platinum catalyst or an organic peroxide catalyst. Exemplary embodiments of silicone polymers include Wacker Silicones Elastosil® products. Exemplary silicone polymers may be found in the published U.S. patent application Ser. No. 09/765,695, which is included herein in its entirety. Another exemplary silicone polymer includes liquid silicone rubber, such as Dow 9252 500P.

In one particular embodiment, conveyor belts formed using the fabric illustrated in FIGS. 1 and 2 have a surface including raised protrusions and a flat surface. As illustrated in FIG. 1, the warp inset yarns 104 produce a set of raised protrusions oriented along a longitudinal direction on a first face. A generally flat or lightly textured surface may be formed on a second face as illustrated in FIG. 2 wherein the weft insert yarns 102 are closer to the flat surface than the warp insert yarns 104. Chain knitted yarns may be used to produce a flatter surface than surfaces resulting from other knit patterns. In one embodiment, the fabric is formed into a conveyor belt in which the inside surface includes raised protrusions and the outside surface is generally flat or comparatively flatter. The raised protrusions of the first face illustrated in FIG. 1 may, for example, permit better gripping of a conveyor and the smoother face illustrated in FIG. 2 may allow for easy release of conveyed products.

In one specific embodiment, a conveyor belt is formed of warp insert yarns 102 and weft insert yarns 104 formed from Kevlar® or fiberglass. The weft insert yarns 102 have a cross-sectional aspect ratio of at least about 2:1 and the warp insert yarns 104 have a cross-sectional aspect ratio about 1:1, such as approximately circular cross-sectioned yarns. The warp knitted yarns 106 are chain knitted or Tricot knitted in wales along the warp insert yarns 102 and are formed of Nomex® or fiberglass. The yarns 102, 104 and 106 are coated or impregnated with PTFE fluoropolymer or silicone. The conveyor belt includes at least about 30% open area. In one example, the belt may include at least about 50% open area. Alternately, a fluorinated film lamination may be used that blocks the open area.

Figures 3, 4:
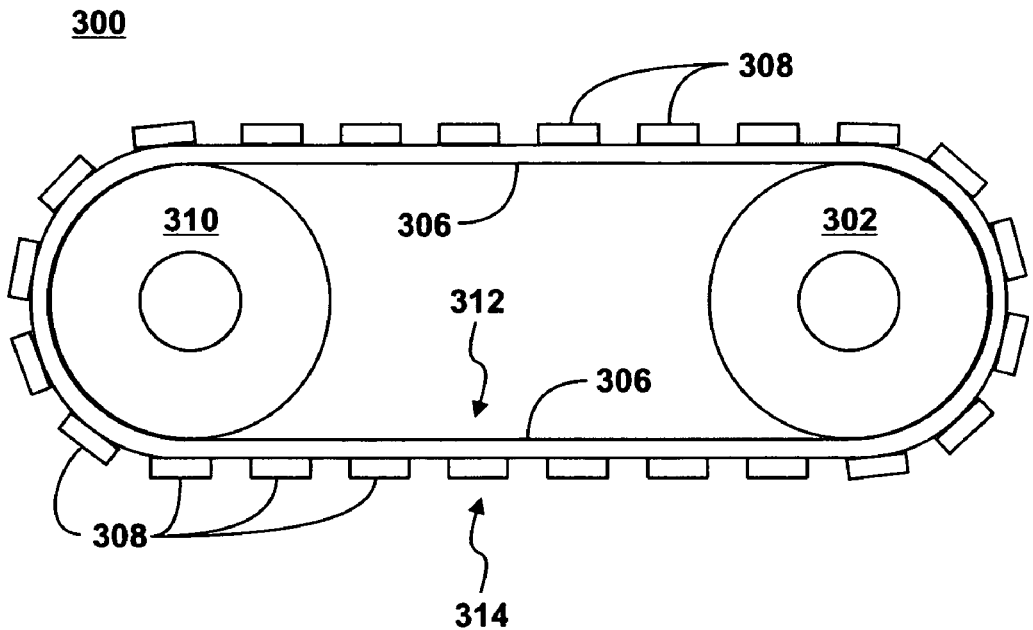
FIG. 3 is a general diagram illustrating an exemplary embodiment of a conveyer system.
FIG. 4 is a flow diagram depicting an exemplary method for belt installation.

FIG. 3 depicts an exemplary conveyer belt system 300. The conveyer belt system 300 includes a conveyer belt 304 configured in a closed loop and wrapped around at least two rollers 302 and 310. An inside surface 312 of the conveyer belt 304 contacts the rollers 302 and 310 and an outer surface 314 of the conveyer belt 304 may be used to convey articles of manufacture, such as through an oven. In one particular embodiment, the longitudinal warp insert yarns 306 having an aspect ratio less than about 2:1 are closest to the inside surface 312 of the conveyer belt 304 and extend longitudinally along the belt, and form elongated protrusions that contact the rollers 302 and 310. The weft insert yarns 308 having aspect ratios greater than about 2:1 (i.e. the flatter or more planar weft insert yarns) lie closer to an outer surface 314 of the conveyer belt 304.

During installation, the conveyer belt 304 may be placed over the rollers (302 and 310) such that the inner surface 312 having the protruding longitudinal warp insert yarns 306 contact the rollers (302 and 310), as shown in step 402 of FIG. 4. The weft insert yarns 308 having a cross-sectional aspect ratio at least 2:1 are located closer to the outer surface 314 of the conveyer belt 304. Once the conveyer belt 304 has been placed over the rollers (302 and 310), tension in the belt may be adjusted, as shown in step 404.

In one particular embodiment, a conveyor belt is formed of weft insert yarns having an aspect ratio at least about 2:1 and formed of warp insert yarns having an aspect ratio less than 2:1 wherein the weft insert yarns and the warp insert yarns are joined with warp knit yarns. The particular embodiment of the conveyor belt exhibits limited extension in the weft and warp directions when tension is applied along the warp or weft directions and extends in a diagonal direction when tension is applied along a diagonal direction. The exemplary conveyor belt returns to its original shape when the tension is released.

According to aspects of the present invention, embodiments are provided that have improved article-handling capability, by incorporating a relatively flat or lightly textured working surface. In addition, certain embodiments take advantage of heat-resistant materials, including materials of the insert and stitch yarns, as well as of the polymer with which the knitted fabric is impregnated.

Due to structural aspects, the conveyer belt may have improved tracking, permitting continuous use in its intended environment even if slight misalignment between the rollers occurs. In this regard, the conveyer belt has been shown to be dimensional stable when tension is applied in the longitudinal (direction of travel of the belt) and lateral (widthwise) directions. In contrast, the belt may exhibit elasticity or resiliency when tension is applied at an angle between the longitudinal and lateral directions, such as diagonally. This resiliency is advantageous, allowing easier conformance to the conveyor systems. The belt accommodates and fits to what may be misalignment of the conveyor.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A conveyor belt comprising:
    a set of warp knitted yarns configured in warp oriented wales;
    a set of weft insert yarns inserted in the set of warp oriented wales and having a cross-sectional aspect ratio at least about 2:1; and
    a set of warp insert yarns having a cross-sectional aspect ratio less than about 2:1,
        wherein the set of weft insert yarns overlie the set of warp insert yarns and are coupled to the warp insert yarns by the set of warp knitted yarns.

2. The conveyor belt of claim 1, wherein the warp knitted yarns are oriented in wales along the warp insert yarns.

3. The conveyor belt of claim 1, wherein the set of warp insert yarns maintain at least about 80% of their tensile strength at an operating temperature of at least about 260° C.

4. The conveyor belt of claim 1, wherein the set of warp insert yarns maintain at least about 80% of their tensile strength at an operating temperature of at least about 300° C.

5. The conveyor belt of claim 1, wherein the set of warp insert yarns comprise a material selected from a group consisting of nylon, polyester; polyphenolic compounds, polyphenelynesulphide, polybenzimidoazole, ceramic, carbon, glass, and aramid.

6. The conveyor belt of claim 5, wherein the set of warp insert yarns comprise aramid material.

7. The conveyor belt of claim 1, wherein the cross sectional aspect ratio of the warp insert yarns is less than about 2:1.

8. The conveyor belt of claim 1, wherein the set of weft insert yarns maintain at least about 80% of their tensile strength at an operating temperature of at least about 260° C.

9. The conveyor belt of claim 1, wherein the set of weft insert yarns maintain at least about 80% of their tensile strength at an operating temperature of at least about 300° C.

10. The conveyor belt of claim 1, wherein the set of weft insert yarns comprise a material selected from a group consisting of nylon, polyester, polyphenolic compounds, polyphenelynesuiphide, polybenzimidoazole, ceramic, carbon, glass, and aramid.

11. The conveyor belt of claim 10, wherein the set of well insert yarns comprise aramid material.

12. The conveyor belt of claim 1, wherein the cross-sectional aspect ratio of the set of well insert yarns is at least about 3:1.

13. The conveyor belt of claim 12, wherein the cross-sectional aspect ratio of the set of well insert yarns is at least about 5:1.

14. The conveyor belt of claim 1, wherein the cross-sectional aspect ratio of the set of well insert yarns is between about 2:1 and about 35:1.

15. The conveyor belt of claim 1, wherein the set of warp knitted yarns maintain at least about 80% of their tensile strength at an operating temperature of at least about 260° C.

16. The conveyor belt of claim 1, wherein the set of warp knitted yarns maintain at least about 80% of their tensile strength at an operating temperature of at least about 300° C.

17. The conveyor belt of claim 1, wherein the set of warp knitted yarns comprise a material selected from a group consisting of nylon, polyester, polyphenolic compounds, polyphenelynesulphide, polybenzimidoazole, ceramic, carbon, glass, and aramid.

18. The conveyor belt of claim 17, wherein the set of warp knitted yarns comprise aramid material.

19. The conveyor belt of claim 1, further comprising a polymer coating.

20. The conveyor belt of claim 19, wherein the polymer coating comprises fluoropolymer.

21. The conveyor belt of claim 20, wherein the fluoropolymer comprises fluorinated elastomer.

22. The conveyor belt of claim 20, wherein the fluoropolymer comprises PTFE.

23. The conveyor belt of claim 19, wherein the polymer coating comprises silicone.

24. The conveyor belt of claim 19, wherein the polymer coating remains substantially free of charring at an operating temperature of at least about 260° C.

25. The conveyor belt of claim 19, wherein the polymer coating remains substantially free of charring at an operating temperature of at least about 300° C.

26. The conveyor belt of claim 1, wherein the conveyor belt comprises at least about 30% open area 27. The conveyor belt of claim 26, wherein the conveyor belt comprises at least about 50% open area.

28. The conveyor belt of claim 26, wherein the open area is formed from an array of openings.

29. The conveyor belt of claim 1, wherein the conveyor belt is formed in a continuous loop and wherein the set of weft insert yarns are located along an outer surface of the continuous loop.

30. The conveyor belt of claim 29, wherein a set of warp insert yarns are located along an inner surface of the continuous loop.

31. A system comprising:
    first and second rollers; and
    a closed loop conveyor belt contacting the first and second rollers and comprising:
        a set of warp knitted yarns configured in warp oriented wales;
        a set of weft insert yarns inserted in the set of warp oriented wales and having a cross-sectional aspect ratio at least about 2:1, and
        a set of warp insert yarns having a cross-sectional aspect ratio less than about 2:1,
            wherein the set of weft insert yarns overlie the set of warp insert yarns and are coupled to the warp insert yarns by the set of warp knitted yarns.

32. The system of claim 31, wherein closed loop conveyor belt includes an inner surface and wherein the set of warp insert yarns form protrusions along the inner surface, the protrusions contacting the rollers.

33. A closed loop conveyor belt having opposite inner and outer major surfaces and having a set of warp insert yarns underlying a set of well insert yarns, the warp insert yarns extending along the inner major surface, a set of warp knitted yarns configured in warp oriented wales coupling the well insert yarns to the warp insert yarns. the set of weft insert yarns having a cross-sectional aspect ratio at least about 2:1, the set of set of warp insert yarns having a cross-sectional aspect ratio less than about 2:1.

34. The closed loop conveyor belt of claim 33, wherein the warp insert yarns extend along the longitudinal direction of the closed loop belt.

35. A conveyor belt comprising:
    a weft insert warp knit fabric, the weft insert warp knit fabric comprising:
        a set of warp knitted yarns configured in warp oriented wales;
        a set of well insert yarns inserted in the set of warp oriented wales and having a cross-sectional aspect ratio at least about 2:1; and
        a set of warp insert yarns having a cross-sectional aspect ratio less than about 2:1, wherein the set of weft insert yarns overlie the set of warp insert yarns and are coupled to the warn insert yarns by the set of warp knitted yarns; and a polymer coating comprising fluoropolymer.

36. The conveyor belt of claim 35, wherein the fluoropolymer comprises fluorinated elastomer.

37. The conveyor belt of claim 35, wherein the fluoropolyrner comprises PTFE.

38. The conveyor belt of claim 35, further comprising at least about 30% open area.

39. The conveyor belt of claim 35, further comprising at least about 50% open area.

40. The conveyor belt of claim 35, wherein the conveyor belt is a closed loop conveyor belt and wherein the warp insert yarns are located along an inside surface of the closed loop conveyor belt.

41. The conveyor belt of claim 35, wherein the conveyor belt is configured to operate at temperatures at least about 260° C.

42. A conveyor belt comprising:
a weft insert warp knit fabric, the weft insert warp knit fabric comprising:
a set of warp knitted yarns configured in warp oriented wales;
a set of weft insert yarns inserted in the set of warp oriented wales and having a cross-sectional aspect ratio at least about 2:1; and
a set of warp insert yarns having a cross-sectional aspect ratio less than about 2:1,
wherein the set of weft insert yarns overlie the set of warp insert yarns and are coupled to the warp insert yarns by the set of warp knitted yarns; and
a polymer coating comprising silicone.

43. The conveyor belt of claim 42, wherein the conveyor belt is configured to operate at temperatures at least about 260° C.

44. A method of installing a conveyor belt, the method comprising:
placing a conveyor belt over a set of rollers, the conveyor belt comprising a set of warp insert yarns coupled to a set of weft insert yarns by a set of warp knitted strands configured in warp oriented wales, the set of weft insert yarns having a cross-sectional aspect ratio at least about 2:1, the set of warp insert yarns having a cross-sectional aspect ratio less than about 2:1, wherein the set of weft insert yarns overlie the set of warp insert yarns;
wherein the set of warp insert yarns are configured to contact the roller.

* * * * *